US010989253B2

(12) United States Patent
Lorenz

(10) Patent No.: US 10,989,253 B2
(45) Date of Patent: Apr. 27, 2021

(54) CLUTCH DEVICE

(71) Applicant: Schaeffler Technologies AG & Co. KG, Herzogenaurach (DE)

(72) Inventor: Elmar Lorenz, Rheinmünster Söllingen (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 16/336,237

(22) PCT Filed: Nov. 17, 2017

(86) PCT No.: PCT/DE2017/100984
§ 371 (c)(1),
(2) Date: Mar. 25, 2019

(87) PCT Pub. No.: WO2018/095474
PCT Pub. Date: May 31, 2018

(65) Prior Publication Data
US 2019/0271362 A1 Sep. 5, 2019

(30) Foreign Application Priority Data

Nov. 24, 2016 (DE) .......................... 102016223277.0

(51) Int. Cl.
*F16D 21/06* (2006.01)
*B60K 6/48* (2007.10)
(Continued)

(52) U.S. Cl.
CPC .............. *F16D 21/06* (2013.01); *B60K 6/387* (2013.01); *B60K 6/40* (2013.01); *B60K 6/48* (2013.01);
(Continued)

(58) Field of Classification Search
CPC ........ F16D 21/06; F16D 25/082; F16D 13/52; F16D 25/0638; F16D 25/10;
(Continued)

(56) References Cited

U.S. PATENT DOCUMENTS 8,714,287 B2 * 5/2014 Kim .......................... B60K 6/40
180/65.22
8,991,576 B2 * 3/2015 Sperrfechter ........... F16H 45/02
192/3.26
(Continued)

FOREIGN PATENT DOCUMENTS

| CN | 1876421 A | 12/2006 |
|---|---|---|
| CN | 1952421 A | 4/2007 |

(Continued)

OTHER PUBLICATIONS

Machijne language translation of DE102012024699.*
Machine language translation of EP2287487.*

*Primary Examiner* — Mark A Manley
(74) *Attorney, Agent, or Firm* — Kevin Parks

(57) ABSTRACT

A clutch device includes a rotor, a first sub-clutch, a second sub-clutch, and a first actuation device. The rotor has a first axial side and a second axial side. The sub-clutches are arranged within the rotor and each include an outer disk carrier with outer disks and an inner disk carrier with an inner disk engaged between two of the outer disks. The first actuating device is for actuating the first sub-clutch or the second sub-clutch. The first actuating device has a first housing. The rotor first axial side is rotatably mounted on the first housing via a first support.

14 Claims, 3 Drawing Sheets

(51) Int. Cl.
*F16D 25/08* (2006.01)
*B60K 6/40* (2007.10)
*B60K 6/387* (2007.10)
*F16C 19/00* (2006.01)
*F16D 13/52* (2006.01)
*F16D 25/0638* (2006.01)
*F16D 25/10* (2006.01)
*H02K 7/00* (2006.01)
*H02K 7/108* (2006.01)

(52) U.S. Cl.
CPC .............. *F16C 19/00* (2013.01); *F16D 13/52* (2013.01); *F16D 25/0638* (2013.01); *F16D 25/082* (2013.01); *F16D 25/10* (2013.01); *H02K 7/006* (2013.01); *H02K 7/108* (2013.01); *B60K 2006/4825* (2013.01); *B60Y 2200/92* (2013.01); *F16C 2326/01* (2013.01); *F16D 2021/0661* (2013.01); *F16D 2021/0692* (2013.01)

(58) Field of Classification Search
CPC ......... F16D 2021/661; F16D 2021/692; F16D 2021/0607; B60K 6/48; B60K 6/40; B60K 6/387; B60K 2006/4825; F16C 19/00; F16C 2326/01; H02K 7/006; H02K 7/108; B60Y 2200/92
See application file for complete search history.

(56) References Cited

U.S. PATENT DOCUMENTS

2007/0049445 A1* 3/2007 Reisch .................. B60K 6/387
475/5
2007/0089962 A1 4/2007 Enstrom

FOREIGN PATENT DOCUMENTS

| | | |
|---|---|---|
| CN | 101595320 A | 12/2009 |
| CN | 101746248 A | 6/2010 |
| CN | 101927690 A | 12/2010 |
| CN | 102007012 A | 4/2011 |
| CN | 102205789 A | 10/2011 |
| CN | 102906970 A | 1/2013 |
| CN | 103032482 A | 4/2013 |
| CN | 103206469 A | 7/2013 |
| DE | 10036504 A1 | 2/2001 |
| DE | 102007008946 A1 | 2/2008 |
| DE | 102009059944 A1 | 7/2010 |
| DE | 102012024699 * | 7/2013 |
| EP | 2287487 A1 | 2/2011 |
| JP | 2003063264 A | 3/2003 |
| WO | 2008064813 A2 | 6/2008 |

* cited by examiner

CLUTCH DEVICE

CROSS-REFERENCE TO RELATED APPLICATIONS

This application is the United States National Phase of PCT Appln. No. PCT/DE2017/100984 filed Nov. 17, 2017, which claims priority to German Application No. DE102016223277.0 filed Nov. 24, 2016, the entire disclosures of which are incorporated by reference herein.

TECHNICAL FIELD

The disclosure relates to a clutch device which is coupled or can be coupled to the rotor of an electric machine

BACKGROUND

As is known, a clutch device of this kind is used to couple the drive of a driving device, e.g., an internal combustion engine, to a transmission. In modern motor vehicles having a hybrid drive, an electric motor, which can likewise be coupled to the transmission by means of a clutch device of this kind in order to enable an electric driving mode, is additionally provided. However, it is furthermore also coupled or capable of being coupled to the internal combustion engine via the output thereof in order to assist or drive said engine when starting, for example.

In order to implement these individual couplings, a clutch device of this kind comprises at least two sub-clutches. By means of the first sub-clutch, the rotor of the electric machine can be connected to a driving hub that can be driven by means of an internal combustion engine or the like. This is accomplished by means of a first inner disk carrier of said first sub-clutch, which is connected or can be connected to the driving hub. The rotor itself is connected to a first outer disk carrier of said first sub-clutch. At least two outer disks, generally steel disks, into which there engages an inner disk, generally a friction disk, having a support and friction linings on both sides, which is arranged on the first inner disk carrier, are generally arranged on said outer disk carrier. This disk pack consisting of at least these three disks can be compressed and brought into frictional engagement by means of a suitable actuation element. Thus, the rotor of the electric machine is connected to the driving hub, allowing rotation of the rotor to be transmitted to the driving hub. Since, for its part, the hub is coupled to the internal combustion engine, the internal combustion engine can be driven for starting by this means.

To couple both the internal combustion engine and the electric motor to the transmission, at least one second sub-clutch is provided, said clutch likewise having an outer disk carrier, on which a multiplicity of second outer disks is arranged in an axially movable manner. This outer disk carrier can be the first outer disk carrier, which is coupled to the rotor of the electric machine. In other words, the first and the second outer disks are arranged on the same outer disk carrier. As an alternative, however, it can be a separate, second outer disk carrier.

Also provided is a second inner disk carrier having a multiplicity of second inner disks, wherein, in this case too, the second outer disks are steel disks and the second inner disks are friction disks, for example. The second outer and inner disks likewise form an axially compressible, second disk pack, which can be compressed by means of a suitable actuation element. The second inner disk carrier is connected to a driving hub that is coupled or can be coupled to the transmission. By this means, a rotation of the outer disk carrier of the second sub-clutch, brought about by the internal combustion engine or the electric machine, can be transmitted to the driving hub coupled to the transmission.

The additional integration of a third sub-clutch having an outer and an inner disk pack is known, wherein, in this case too, the outer disks are arranged on the common first outer disk carrier or on a separate, third outer disk carrier, which is likewise coupled to the rotor, while corresponding inner disks are provided on the inner disk carrier. This disk pack too can be compressed by means of a suitable actuation device. Different transmission stage groups can be connected up in a manner known per se by means of the second and third sub-clutches. However, such a third sub-clutch is optional.

A hybrid drive of this kind can be operated in different ways.

In the case of a pure electric drive, the rotation of the rotor is passed to the driving hub via the second and, where applicable, the third sub-clutch, thereby passing the torque to the transmission. During this process, the first sub-clutch is open, and therefore there is no coupling to the internal combustion engine. Consequently, the outer disk carrier of the second and/or the third sub-clutch can be driven by means of the rotor. If this is the first outer disk carrier, which is connected to the rotor in any case, said carrier is necessarily rotated as the rotor rotates. If the second or the third sub-clutch has a separate second or third outer disk carrier, this is coupled in a corresponding manner to the rotor.

If driving is to be performed by the internal combustion engine, the first sub-clutch is closed, that is to say that the driving hub associated with the internal combustion engine is coupled to the rotor. Owing to the coupling thereof with the second or sub-clutch, the torque produced by the internal combustion engine can be transmitted via the first and second and/or third sub-clutch to the driving hub and hence to the transmission. In this case, the rotor of the electric machine, which is not operated in this case, corotates. If there is an integrated third sub-clutch, this is selected in addition thereto alternately with the second sub-clutch, independently of the selected driving mode.

To actuate the sub-clutches provided, corresponding actuation elements are provided, e.g., in the form of pressure pots, which each press against an outer disk situated axially on the outside in order to push the respective disk pack against a stop and bring it into frictional engagement. If the respective disk pack is relieved of load, the compressed disks are supposed to separate from one another, this being referred to as "release" of the disk pack, thereby canceling the frictional engagement and hence torque transmission. The respective sub-clutch is then open.

In order to achieve a clutch device which is as compact as possible and takes up as little installation space as possible, especially in the axial direction, there is a known practice of arranging the sub-clutches within the rotor, that is to say that they are arranged axially in series or optionally also in a radially nested fashion but, in either case, are situated within the rotor. It is thereby possible to use the installation space surrounded by the rotor.

The rotor itself is rotatably mounted, for which purpose it is generally supported or mounted by means of supports provided on both axial sides and by means of corresponding bearing devices, usually on bearing mounts associated with the housing. Since the housing houses the electric motor with an axial clearance, it is consequently necessary to provide these bearing points at an axial distance from the rotor, wherein, in addition, corresponding bearing mounts have to be formed on the housing.

BRIEF SUMMARY

According to the disclosure, the rotor is rotatably mounted, by means of at least one of the supports provided on the axial side of said rotor, on the housing of an actuation device used to actuate the clutch device. This actuation device, which is, for example, a hydraulic actuation device in the form of a CSC (concentric slave cylinder), is installed in a fixed position and since, by means of said actuation device, an actuation element of one sub-clutch is actuated, is arranged in close proximity to the sub-clutch following it when viewed in the axial direction. According to the disclosure, the rotor is now rotatably mounted on the housing of said actuation device. Thus, all that is required is to provide a corresponding bearing seat on said housing, which is situated radially further in than the rotor, on which bearing seat the bearing device, e.g., a rolling bearing, is arranged. When viewed axially, this position is near the next sub-clutch and can be radially further out or further in, depending on the outside diameter of the housing. In either case, however, there is greater compactness since the bearing location is provided on a component which is likewise designed or arranged with a high degree of compactness as regards the installation space available.

In this case, it is particularly expedient if the rotor is also rotatably mounted on a housing of a second actuation device, by means of which at least one clutch device can be actuated, on the second axial side via a second support. Thus, if two separate actuation devices are employed to actuate the first and the second sub-clutch or, if a third sub-clutch is provided, to actuate the third sub-clutch, it is conceivable to rotatably mount the rotor on both sides by means of corresponding supports on a housing of a respective actuation device, e.g., a CSC or an electric actuation device.

In this case, one or both housings can be arranged axially outside the rotor if the installation space within the rotor has already been exhausted in integrating the sub-clutch, and therefore in this case the respective support is rotatably mounted outside the rotor. However, it is also conceivable, if the installation space permits, for one or both housings to project axially into the rotor and for the support to be rotatably mounted within the rotor. Of course, it is also conceivable for the respective bearing arrangement, when viewed radially, to reach at least partially into the rotor since it too, of course, has a certain axial extent. It is furthermore conceivable for one bearing point to be arranged outside and the other to be arranged, at least partially, within the rotor.

According to an example embodiment, it is also conceivable to provide a third sub-clutch including a plurality of third outer disks, which are provided on the first or the second outer disk carrier, or on a third outer disk carrier which is coupled or can be coupled to the rotor, and including a third inner disk carrier, which is provided with third inner disks that engage between the third outer disks and which is likewise arranged within the rotor. In this case, therefore, a triple clutch is implemented, wherein the first sub-clutch is used for coupling the internal combustion engine, while the second and the third sub-clutch are used for coupling to two separate transmission stage groups, this being known per se. In each case, even when a third sub-clutch is formed, said clutch is integrated into the interior of the rotor, giving a compact construction, even where three sub-clutches are implemented.

To support the rotor by means of the support or the two supports, one or two rolling bearings are used, each including an outer and an inner ring. The support is connected either to the outer ring or to the inner ring, depending on the arrangement of the rolling bearing on the housing. If both supports are rotatably mounted on a housing of an actuation device, it is conceivable for one support to be arranged on the outer ring of one rolling bearing, which is seated by means of its inner ring on the outside of the housing of the first actuation device, and for the other support to be arranged on the inner ring of the other rolling bearing, which is seated by means of its outer ring on the inside of the housing of the second actuation device. Thus, exterior support is provided on one side and interior support is provided on the other side. However, it is, of course, also conceivable to arrange the supports on both sides of the outer ring of the rolling bearing, which is then seated on the outside of the housing in each case.

In an example embodiment, the support or supports is/are furthermore connected to the first or the second or, where applicable, to the third outer disk carrier, to which the rotor is also connected. In this case, the outer disks of the first and of the second and, where applicable, also of the third sub-clutch are preferably arranged on the common first outer disk carrier, to which the rotor and the support or supports is/are also connected. In other words, only one common first outer disk carrier, on which all the outer disks of all the sub-clutches are arranged, is provided, allowing a further increase in compactness. The support or supports are arranged directly on the first outer disk carrier, and therefore they can extend radially inward and to the respective bearing seat while being directly adjacent to the respectively adjacent sub-clutch.

If three sub-clutches are provided, the first or the second actuation device can be used to actuate two sub-clutches. Otherwise stated, corresponding actuation mechanisms, by means of which two pressure pots, each assigned to one sub-clutch, can be separately operated, are provided in one housing. If the second support is also mounted on a housing of this kind, this actuation device is used for just one sub-clutch. In this case, the first actuation device can be used to actuate the first and the second clutch, and the second sub-clutch can be used to actuate the third sub-clutch.

In this embodiment, the first sub-clutch can be situated radially further in than the second sub-clutch, and an actuation element, by means of which the second sub-clutch can be actuated, can pass through the first sub-clutch. In other words, the pressure pot used to actuate the second sub-clutch passes through the outer disks of the first sub-clutch, for example. Since the outer disks of both sub-clutches are at the same speed, this is easily possible.

BRIEF DESCRIPTION OF THE DRAWINGS

The disclosure is explained in greater detail below by means of illustrative embodiments with reference to the drawings. The drawings are schematic illustrations and show, in.

DETAILED DESCRIPTION

Figure 1:
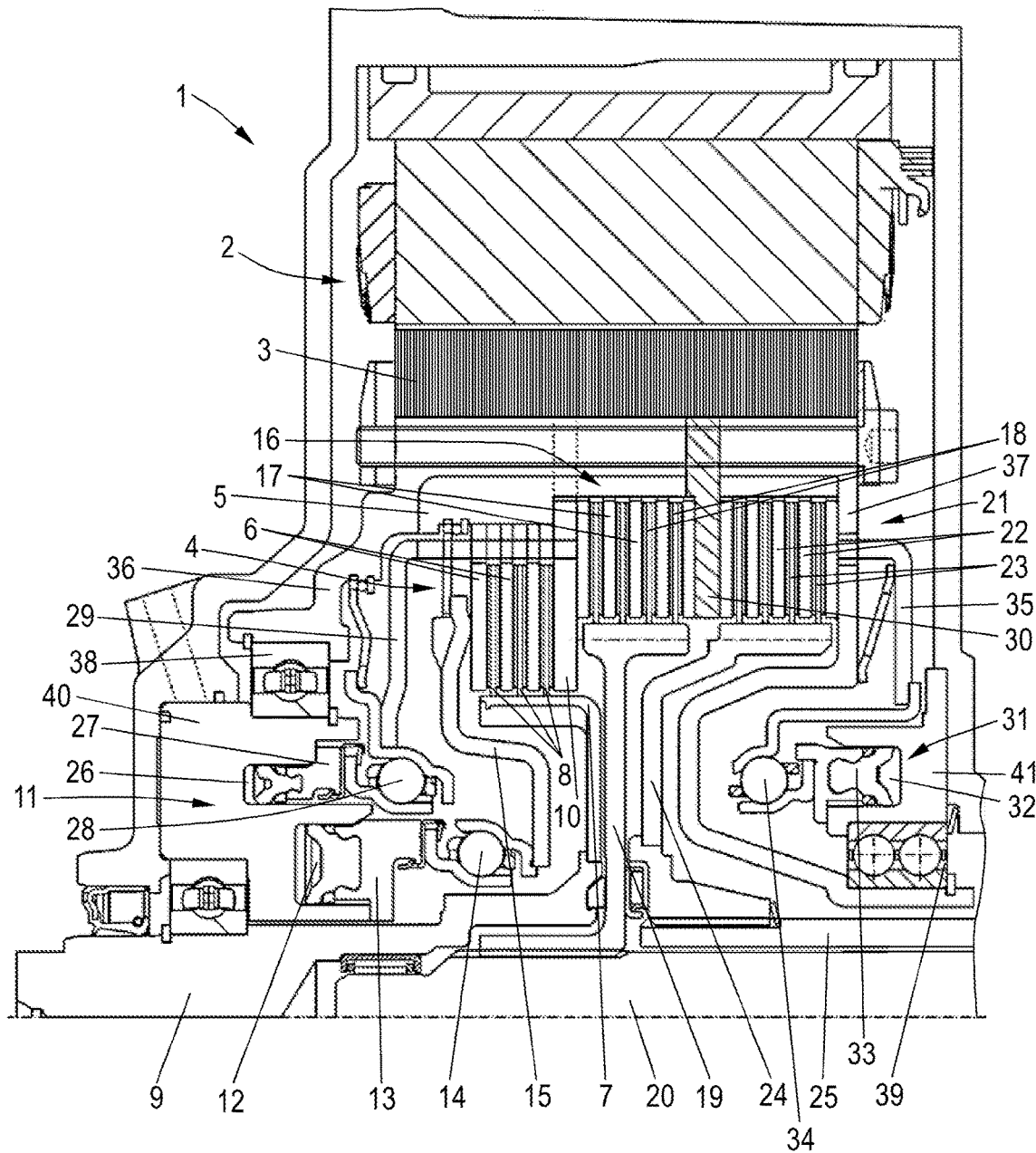
FIG. 1 a clutch device according to the invention in section.

FIG. 1 shows a clutch device 1 according to the invention with an associated electric machine 2 having a rotor 3. A sub-clutch 4, generally also referred to as the K0 clutch, is provided, having an outer disk carrier 5, on which a plurality of outer disks 6, e.g., steel disks, is arranged. A plurality of inner disks 8, in this case friction disks, is arranged on an inner disk carrier 7. The outer disk carrier 5 is firmly connected to the rotor 3, while the inner disk carrier 7 is connected to a driving hub 9, which is coupled to an internal combustion engine (not shown specifically).

The outer and inner disks 6, 8 form a disk pack which, since the outer disks are arranged in an axially movable manner on the respective outer and inner disk carrier 5, 7, can be compressed axially against an abutment 10. In this case, there is a frictional connection and hence torque transmission from the rotor 3, via the outer disk carrier 5, the disk pack and the inner disk carrier 7, to the driving hub 9 in order by this means to start the internal combustion engine, for example. Conversely, it is, of course, also possible by this means to pass a torque from the internal combustion engine to the outer disk carrier 5, which can then be passed via interposed further sub-clutches to a transmission.

To actuate this disk pack including the outer and inner disks 6, 8, a fixed actuation device 11 is provided, which is a hydraulically operating actuation device in the form of a CSC (concentric slave cylinder). By means of a hydraulic fluid, a correspondingly high pressure can be built up in a pressure chamber 12 and leads to an axial movement of the cylinder 13, to which an annular actuation element 15 in the form of a pressure pot is coupled by means of a rolling bearing 14. The axial movement thereof results in the compression of the outer and inner disks 6, 8 and hence the frictional engagement for torque transmission. When the pressure is relieved, the actuation element 15 moves back again, the disks which have been pressed together separate and "release" occurs.

Also provided is a sub-clutch 16, generally also referred to as the K1 clutch. This too comprises a multiplicity of outer disks 17, in this case also steel disks, and of inner disks 18 in the form of friction disks. The outer disks 17 are mounted in an axially movable manner on the outer disk carrier 5, on which the outer disks 6 are also arranged, while the inner disks 18 are arranged in an axially movable manner on a inner disk carrier 19. The inner disk carrier 19 is connected for conjoint rotation to a driving hub 20 connected to the transmission.

By means of this sub-clutch 16, a torque-transmitting connection between the outer disk carrier 5 and hence the rotor 3 and the driving hub 20 and therefore the associated transmission stages of the transmission can be established, allowing a rotation of the rotor 3 to be transmitted for electric driving but equally also allowing a rotation of the driving hub 9 driven by means of the internal combustion engine to be passed to the transmission via said hub.

Finally, sub-clutch 21, generally referred to as the K2 clutch, is provided, likewise comprising a plurality of outer disks 22 embodied in the form of steel disks and a plurality of inner disks 23 embodied in the form of friction disks engaging between said outer disks. Here too, the outer disks 22 are arranged in an axially movable manner on the common outer disk carrier 5, while the inner disks 23 are arranged in an axially movable manner on an inner disk carrier 24, which is connected for conjoint rotation to a drive shaft 25 embodied as a hollow shaft, by means of which drive shaft 25 transmission stages of a second stage group of the transmission are coupled.

The two sub-clutches 16 and 21 with their respective disk packs formed from the outer and inner disks 17, 18 and 22, 23, respectively, can also be opened and closed, for which purpose once again corresponding actuating means are provided. The sub-clutch 16 can likewise be actuated by means of the actuation device 11. For this purpose, a further cylindrical pressure chamber 26 is provided, in which a sufficient pressure can likewise be built up to enable a cylindrical piston 27 to be moved axially. Here too, an actuation element 29 in the form of a pressure pot can be arranged in an axially movable manner thereon by means of a rolling bearing 28. This actuation element 27 passes through the outer disks 6 of the sub-clutch 4, as shown in the figure, and presses on the outer disk 17 on the left of the sub-clutch 16, enabling it to be compressed against an abutment 30. The sub-clutch 16 is thereby closed. When the pressure is relieved, it opens again.

To actuate the sub-clutch 21, a actuation device 31 is provided, likewise comprising a cylindrical pressure chamber 32, in which a movable cylindrical piston 33 is arranged, to which a further actuation element 35 in the form of a pressure pot is coupled by means of a rolling bearing 34. This actuation element engages on the outer disk 22 of the sub-clutch 21 situated on the outer right, allowing it to be compressed axially against the abutment 30. When the pressure is relieved, the sub-clutch 21 is released in this case too.

This actuation device 31 is also designed as a hydraulic actuation device in the form of a CSC. In other words, the actuation of all three sub-clutches 4, 16 and 21 is performed hydraulically by means of respective CSCs.

The rotor 3 and, with the latter, the outer disk carrier 5, which is used jointly here, is rotatably mounted by means of two supports 36, 37 provided axially. The two supports 36, 37 extend radially inward. The rotatable mounting is in each case accomplished by means of a rolling bearing 38, 39. According to the disclosure, these two rolling bearings 38, 39 are seated on the respective housing 40, 41 of the respective actuation device 11, 31.

Figure 2:
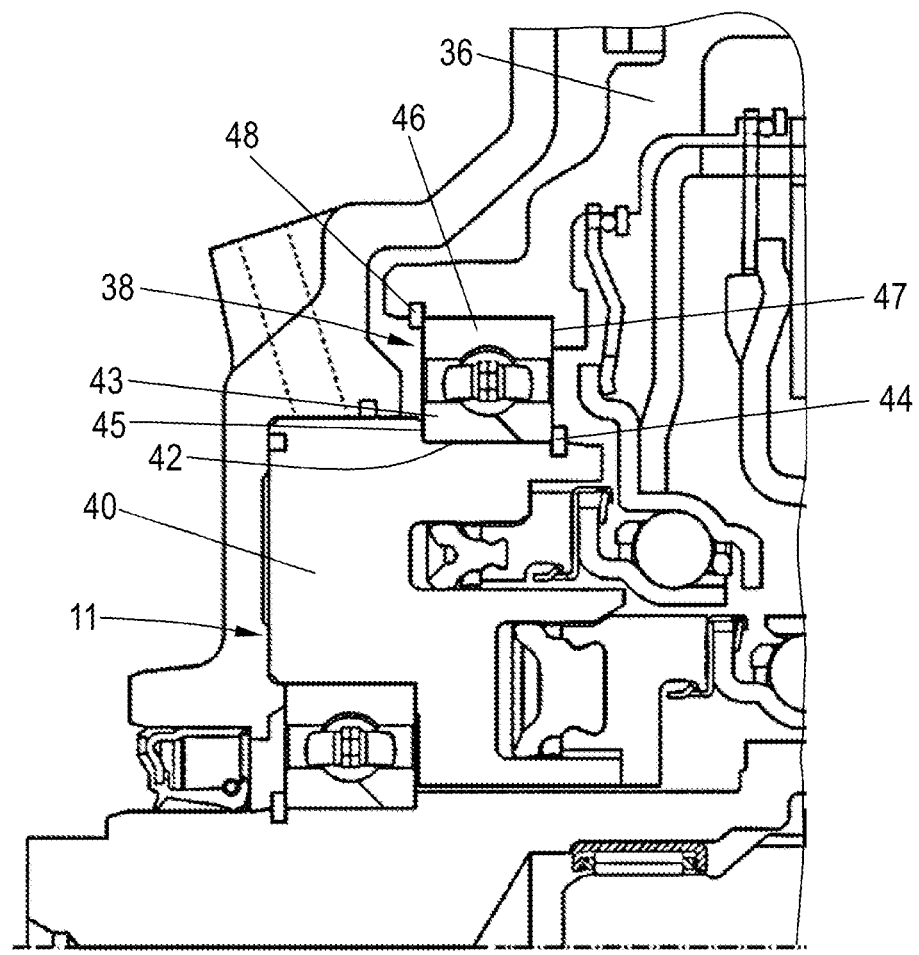
FIG. 2 an enlarged partial view of the clutch device from FIG. 1, illustrating the mounting of the rotor on a first actuation device, and FIG. 3 an enlarged partial view of the clutch device from FIG. 1, illustrating the mounting of the rotor on a second actuation device.
Figure 3:
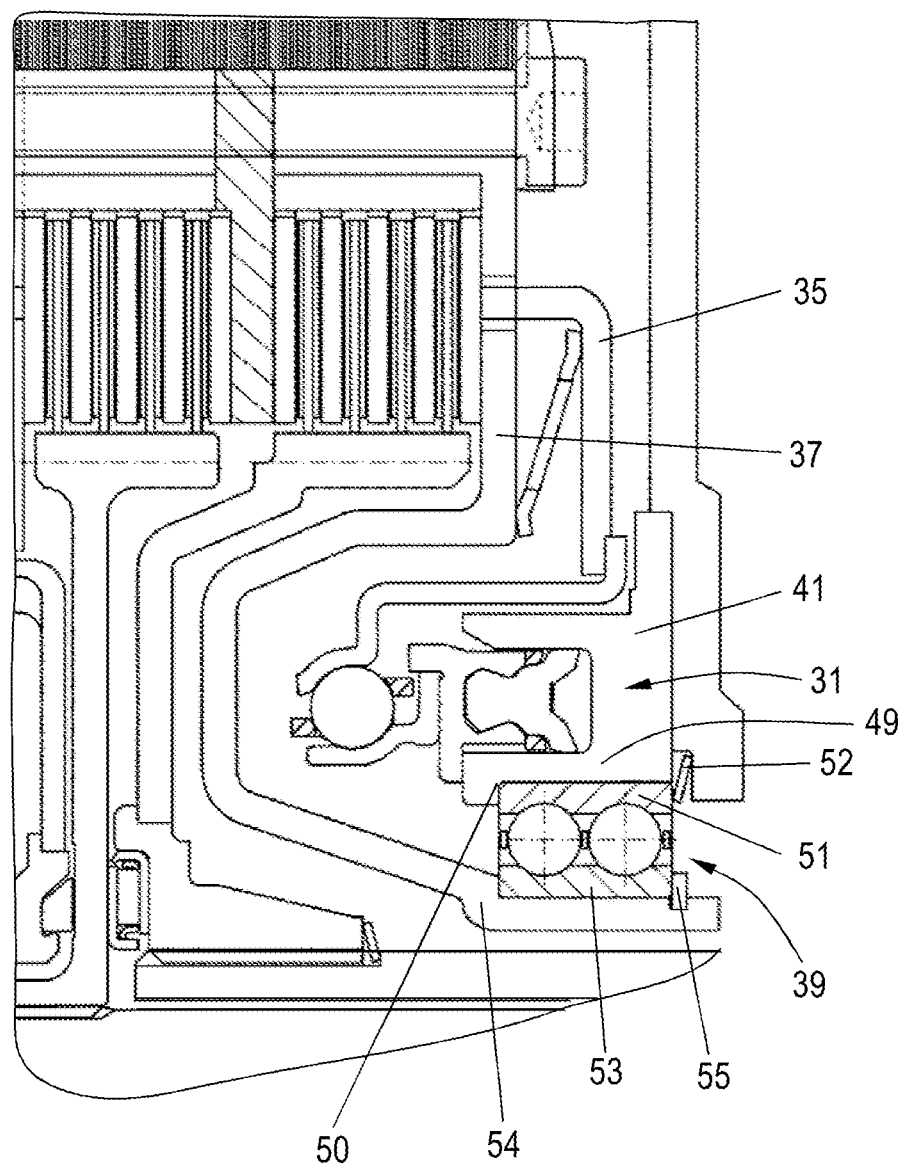

FIGS. 2 and 3 each show segments of the clutch device 1 from FIG. 1 with corresponding bearing regions.

As FIG. 2 shows, a bearing seat 42, in which the outer ring 43 of the rolling bearing 38 is accommodated and secured by means of a retaining ring 44 and a stop 45 situated on the other side, is formed on the housing 40 of the actuation device 11. The support 36 is connected to the outer ring 46, for which purpose said outer ring rests against a stop 47 and is secured axially on the other side by means of a retaining ring 48. Here, therefore, the support 36 is rotatably mounted on the outside of the housing 40.

The embodiment of the mounting of the support 37 shown in FIG. 3 is different. The support 37, through which furthermore (see FIG. 3) the actuation element 35 used to compress the disk pack of the sub-clutch 21 passes in corresponding apertures, is angled in such a way that it extends into the region below the housing 41 of the actuation device 31. A corresponding bearing seat 49, having a stop 50, against which the outer ring 51 of the rolling bearing 39 rests, is formed on the inside of the housing 41. A retaining ring 52, which secures the outer ring 51 axially, is provided on the other side.

The support 37 itself engages in the inner ring 53 of the rolling bearing 39. The inner ring 53 rests against a stop 54 of the support 37 and is secured axially by means of a retaining ring 55. Here, therefore, the rotor is positioned on the inside of the housing.

The two actuation devices, i.e. the two CSCs, thus have a dual function here. On the one hand, they serve as actuators for controlling the individual sub-clutches. On the other hand, the two housings thereof simultaneously serve as mounts for the rotor bearing assembly. Since the CSC housings 40, 41 are situated relatively far inward when viewed radially, it is possible for this reason to reduce the diameters of the rolling bearings 38, 39 but otherwise no further housing supports are required as bearing mounts. By machining the CSC housing as contour path logic, it is furthermore ensured that the bearings have a small coaxial offset. The unbalance, or imbalance, is therefore also extremely small.

REFERENCE LABELS 1 clutch device
2 electric machine
3 rotor
4 sub-clutch
5 outer disk carrier
6 outer disk
7 inner disk carrier
8 inner disk
9 driving hub
10 abutment
11 actuation device
12 pressure chamber
13 cylinder
14 rolling bearing
15 actuation element
16 sub-clutch
17 outer disk
18 inner disk
19 inner disk carrier
20 driving hub
21 sub-clutch
22 outer disk
23 inner disk
24 inner disk carrier
25 drive shaft
26 pressure chamber
27 piston
28 rolling bearing
29 actuation element
30 abutment
31 actuation element
32 pressure chamber
33 piston
34 rolling bearing
35 actuation element
36 support
37 support
38 rolling bearing
39 rolling bearing
40 housing
41 housing
42 bearing seat
43 outer ring
44 retaining ring
45 stop
46 outer ring
47 stop
48 retaining ring
49 bearing seat
50 stop
51 outer ring
52 retaining ring
53 inner ring
54 stop
55 retaining ring

The invention claimed is:

1. A clutch device comprising:
a rotor of an electric machine comprising a first axial side and a second axial side;
a first sub-clutch arranged within the rotor, comprising:
a first outer disk carrier, coupled to the rotor, comprising:
at least two first outer disks; and,
a first inner disk carrier comprising:
at least one first inner disk that engages between the at least two first outer disks; and,
a second sub-clutch arranged within the rotor, comprising:
a second outer disk carrier, integral with the first outer disk carrier or separate from the first outer disk carrier and coupled to the rotor, comprising:
at least two second outer disks; and,
a second inner disk carrier comprising:
at least one second inner disk that engages between the at least two second outer disks; and,
a first actuation device for actuating the first sub-clutch or the second sub-clutch, the first actuation device comprising:
a first housing with a first ring-shaped bore;
a first ring-shaped piston installed in the first ring-shaped bore; and
a first ring-shaped pressure chamber at least partially formed by the first ring-shaped bore and the first ring-shaped piston, wherein the first axial side is rotatably mounted on the first housing via a first support and the second axial side is rotatably mounted via a second support spaced from the first housing.

2. The clutch device of claim 1, wherein the first support is connected to the first outer disk carrier or the second outer disk carrier.

3. The clutch device of claim 1, wherein the first actuation device is for actuating the first sub-clutch and the second sub-clutch.

4. The clutch device of claim 1, wherein:
the first housing is arranged axially outside of the rotor and the first axial side is rotatably mounted to the first support outside the rotor; or,
the first housing projects axially into the rotor and the first axial side is rotatably mounted to the first support within the rotor.

5. The clutch device of claim 1 further comprising a first bearing with a first outer ring and a first inner ring, wherein the first support is:
rotatably mounted on the first housing by the first rolling bearing; and,
connected to the first outer ring or the first inner ring.

6. The clutch device of claim 1, further comprising:
a third sub-clutch arranged within the rotor, comprising:
  a third outer disk carrier, integral with the first outer disk carrier or the second outer disk carrier, or separate from the first outer disk carrier and the second outer disk carrier and coupled to the rotor, comprising:
    at least two third outer disks; and,
  a third inner disk carrier comprising:
    at least one third inner disk that engages between the at least two third outer disks.

7. The clutch device of claim 6, wherein the first support is connected to the first outer disk carrier, the second outer disk carrier, or the third outer disk carrier.

8. The clutch device of claim 6, further comprising a second actuation device, wherein:
the first actuation device is for actuating the first sub-clutch and the second sub-clutch; and,
the second actuation device is for actuating the third sub-clutch.

9. The clutch device of claim 6 further comprising a second actuation device for actuating the third sub-clutch, the second actuating device comprising a second housing, wherein the second axial side is rotatably mounted on the second housing via the second support.

10. The clutch device of claim 9 further comprising a second bearing with a second outer ring and a second inner ring, wherein the second support is:
rotatably mounted on the second housing by the second rolling bearing; and,
connected to the second outer ring or the second inner ring.

11. The clutch device of claim 9, wherein:
the second housing is arranged axially outside of the rotor and the first axial side is rotatably mounted to the second support outside the rotor; or,
the second housing projects axially into the rotor and the first axial side is rotatably mounted to the second support within the rotor.

12. The clutch device of claim 9 further comprising:
a first bearing with a first outer ring and a first inner ring; and,
a second bearing with a second outer ring and a second inner ring, wherein:
the first support is arranged on the first outer ring; and,
the first inner ring is seated on an outside of the first housing;
the second support is arranged on the second inner ring; and,
the second outer ring is seated on an inside of the second housing.

13. The clutch device of claim 3, wherein:
the first housing comprises a second ring-shaped bore, and
the first actuation device further comprises:
  a second ring-shaped piston installed in the second ring-shaped bore; and
  a second ring-shaped pressure chamber at least partially formed by the second ring-shaped bore and the second ring-shaped piston.

14. The clutch device of claim 9, wherein:
the second housing comprises a third ring-shaped bore, and
the second actuation device further comprises:
  a third ring-shaped piston installed in the third ring-shaped bore; and
  a third ring-shaped pressure chamber at least partially formed by the third ring-shaped bore and the third ring-shaped piston.

* * * * *